(12) United States Patent
Bartels et al.

(10) Patent No.: US 6,320,494 B1
(45) Date of Patent: Nov. 20, 2001

(54) FULL DUPLEX COMMUNICATION SYSTEM WITH POWER TRANSFER ON ONE PAIR OF CONDUCTORS

(75) Inventors: James I. Bartels, Hudson, WI (US); Robert D. Juntunen, Minnetonka; Norman G. Planer, Annandale, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/484,631

(22) Filed: Jan. 18, 2000

(51) Int. Cl.$^7$ .................................................. H04M 11/04
(52) U.S. Cl. ............................... 340/310.01; 340/310.02; 340/310.06
(58) Field of Search .................... 340/310.01, 310.2, 340/310.05, 310.06, 310.07, 310.08, 870.02, 870.24, 693.1; 236/46 R

(56) References Cited

U.S. PATENT DOCUMENTS

| 3,659,277 | 4/1972 | Brown | 340/870.02 |
| 3,938,129 | * 2/1976 | Smither | 340/310.02 |
| 4,234,926 | * 11/1980 | Wallace et al. | 702/188 |
| 5,365,223 | 11/1994 | Sigafus | 340/693.1 |
| 5,635,896 | 6/1997 | Tinsley et al. | 340/310.05 |
| 6,281,784 | * 8/2001 | Redgate et al. | 340/310.01 |

FOREIGN PATENT DOCUMENTS

| 94309734.5 | 6/1995 | (EP) . |
| PCT/NO96/ 00076 | 10/1996 | (WO) . |
| PCT/AU99/ 00151 | 9/1999 | (WO) . |

* cited by examiner

Primary Examiner—Van T Trieu

(57) ABSTRACT

A local station and a remote station are connected by a single pair of conductors. The local station communicates with the remote station by modulating a power supply within the local station which provides power on the conductor pair for operating the remote station. The remote station modulates its impedance, causing a change in current flow on the conductor pair which the local station can detect. In this way both stations can transmit data to each other at the same time and while the local station is providing operating power to the remote station.

17 Claims, 2 Drawing Sheets

FULL DUPLEX COMMUNICATION SYSTEM WITH POWER TRANSFER ON ONE PAIR OF CONDUCTORS

BACKGROUND OF THE INVENTION

Certain communication systems have a local station and a remote station drawing its operating power from the local station. That is, the remote station has no power source other than the local station. It is often convenient if only a single pair of conductors connects the stations. For example, there may already be existing only a single pair of conductors, and adding another pair will be costly. Thus, for a system comprising a local station providing power to and communicating with a remote station with only a single pair of conductors connecting them, both data and power must be carried on that same pair of conductors.

Carrying both power and data on the same pair of conductors creates a more complex problem, but one which has previously been solved in a number of different ways. In these earlier systems, the communication is uniplex, i.e., is in only one direction, from the local to the remote station, or vice versa. For example, U.S. Pat. Nos. 3,659,277 (Brown) and U.S. Pat. No. 5,635,896 (Tinsley et al) both disclose a local receiver which provides power to and receives data from a remote transmitter.

In certain of these situations where a local station provides power for both itself and a remote station, it would be more useful if duplex (two way) communication between the stations was available. Best of all would be a system with full duplex operation, where simultaneous communication in both directions is possible, rather than half duplex, where communication in only one direction at any given instant is possible.

One situation in particular where a single pair of conductors carrying both power and full duplex communication has utility is in detecting flame within boilers and other combustion devices. The most common technologies now in use include a discharge tube to detect UV radiation emanating from the flame. Such discharge tubes are located in close proximity to and in line of sight of the combustion chamber and require a pair of conductors for connection to the flame signal processor. There are alternative solid state UV detectors which often require a local preamplifier to process the small signals generated by variations in the UV radiation emitted by the flame. Since two wires are already available, it is much easier in the retrofit situation to use only the existing wiring. Further, if new wiring is installed to increase the number of wires between the flame signal processor and the flame detector, there is additional cost and increased possibility of miswiring. Communication between the flame detector and the processor allows testing of the detector. Power must be supplied to the detector to operate the sensor in some cases, and to operate a preamplifier.

BRIEF DESCRIPTION OF THE INVENTION

We have discovered a system which has a local station providing power to both itself and to a remote station on a single pair of conductors, and which also allows full duplex communication between the stations at all times on the single pair of conductors. In this system, we rely on variations in current for communicating in one direction, and variations in voltage for communicating in the other direction.

Such a system comprises in the local station, a variable voltage power supply having first and second supply terminals and a supply control terminal. This power supply provides a first preselected power voltage between the first and second supply terminals responsive to a first value of a supply control signal at the control terminal, and a second preselected power voltage lower than the first power voltage between the first and second supply terminals responsive to a second value of the supply control signal.

The local station also includes a current sensor having a first sensor terminal connected to the first supply terminal, a second sensor terminal in electrical connection to the first sensor terminal and supplying current received at the first sensor terminal. The current sensor also includes a current signal terminal providing a current sensor signal having a first value responsive to current greater than a preselected value flowing from the first to the second sensor terminal, and a second value otherwise.

The remote station includes a voltage sensor having first and second voltage sensor terminals for connection through the pair of conductors respectively to the second sensor terminal and to the second power terminal. The voltage sensor provides a voltage sensor signal at a voltage signal terminal. The voltage sensor signal has a first value when the voltage between the first and second voltage sensor terminals is greater than a preselected value, and a second value otherwise.

The remote station also includes a current shunt connected between the third and fourth sensor terminals. The shunt has a current control terminal for receiving a remote data signal. The current shunt presents a non-zero first impedance responsive to a first value of the remote data signal, and a second impedance greater than the first impedance responsive to a second value of the remote data signal.

This structure allows the current sensor to provide a current sensor signal which reproduces the data content of the remote data signal and the voltage sensor to provide a voltage sensor signal which reproduces the data content of the local data signal.

In one version of this system the remote station includes a voltage regulator receiving unregulated power from the local station through the pair of conductors, and providing regulated voltage. The remote station can also include a load receiving the regulated voltage. The load, voltage regulator, and shunt then collectively form between the first and second conductors a composite impedance having high and low impedance values as the switch is respectively open and closed. We prefer that the high and low impedance values of the composite impedance cause current flow through the conductors, respectively above and below a datum current value regardless of which of the first and second preselected power voltages is provided by the power supply. This specific structure allows this system to simultaneously transmit data both ways between the local and remote stations.

One useful application for this system is in powering and communicating with a remote sensor such as a flame detector in a furnace or boiler, and periodically testing that it is operating properly. A sensor controller in the remote station can disable its operation in some way, which for a flame detector will cause the flame detector output to change from indicating flame present to for a brief period of time, indicating flame failure. If this change in the flame detector output does not occur, then the system can be safely shut down before an undetected flame failure occurs.

DESCRIPTION OF THE PREFERRED EMBODIMENTS

Figure 1:
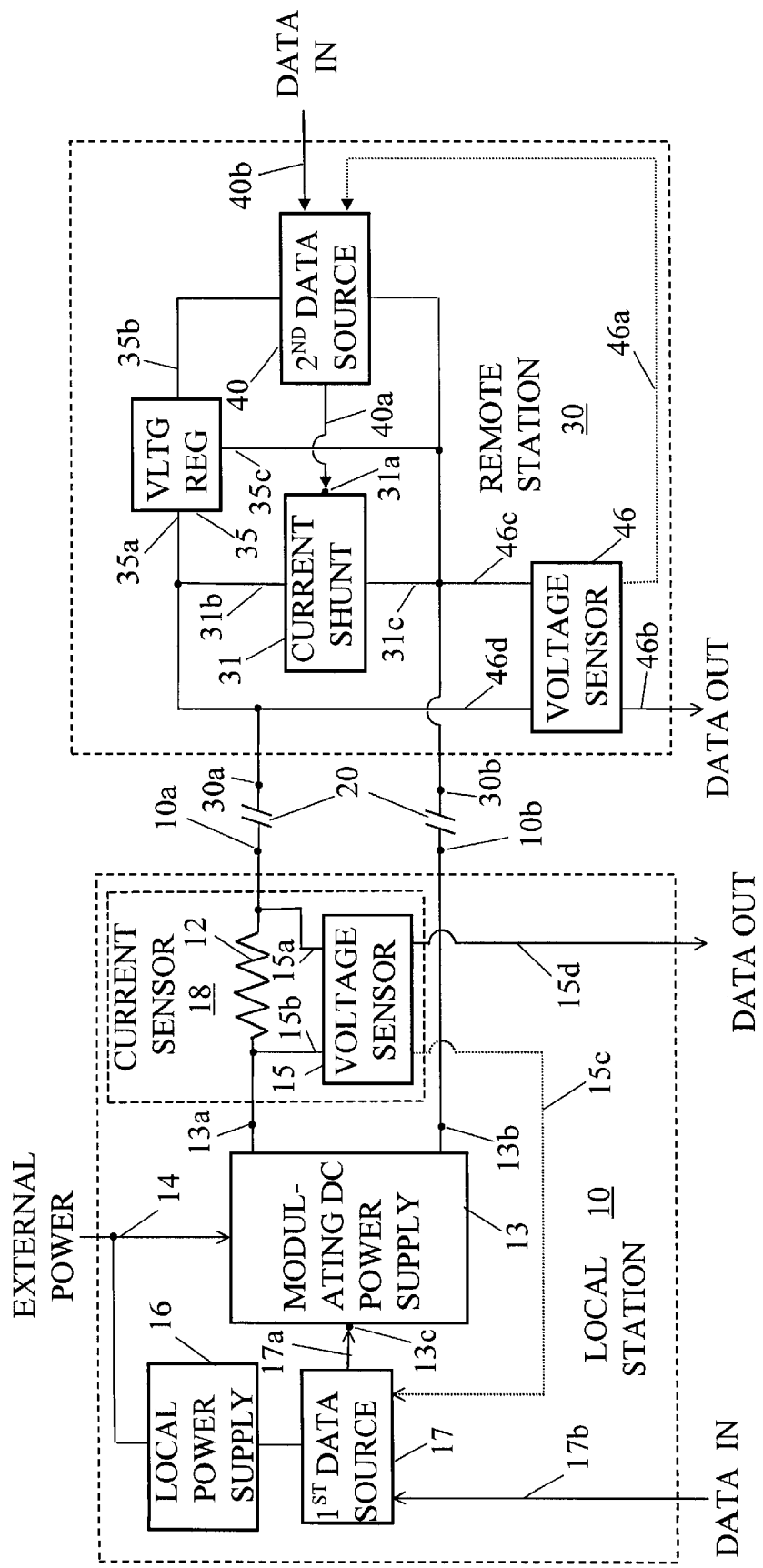
FIG. 1 is a generic block diagram of a communication system embodying the invention.

The communication system of FIG. 1 is intended for use anywhere one desires to use a single pair of conductors 20 to connect a local station 10 with a remote station 30, and where the conductors 20 carry both data in full duplex and power. Local station 10 has terminals 10a and 10b for connection to terminals 30a and 30b of the remote station 30. Local station 10 receives external power on a path 14. A local power supply 16 provides operating DC voltage for the various circuits comprising local station 10 including a local data source shown as first data source 17. Data source 17 will often comprise a microprocessor but may also comprise a digital data receiver or generator such as a modem. Data source 17 provides on path 17a a local data signal which can assume first and second values. The term "local" here is intended to suggest only that the local data is available to the local station 10. Data source 17 may receive local data from outside the system on a path 17b as shown.

For transmitting information to remote station 30, local station 10 includes a modulating DC power supply 13 providing a variable DC voltage across power terminals 13a and 13b. The term "modulating" here means that power supply 13 provides different output voltages depending on the level of the input signal supplied to terminal 13c from path 17a. Power output terminal 13a is connected to connection terminal 10a and to one of the pair of conductors 20 through a current sensor 18. Power output terminal 13b is connected to connection terminal 10b and the other of the pair of conductors 20. When data source 17 provides a local data signal having its first value to terminal 13c, power supply 13 provides a first preselected power voltage between its supply terminals 13a and 13b. When data source 17 provides a local data signal having its second value to terminal 13c, power supply 13 provides a second preselected power voltage lower than the first preselected voltage between its supply terminals 13a and 13b. In one embodiment, power supply 13 provides 12 and 10 v. respectively as the first and second power voltages. There are many possible and easily devised designs for power supply 13; no particular note need be taken of the specific design.

For receiving or detecting information transmitted from remote station 30, local station 10 includes current sensor 18 which comprises a voltage sensor 15 and a resistor or other impedance 12. Resistor 12 has a first terminal connected to power supply terminal 13a and a second terminal serving as connection terminal 10a for local station 10 for connection to one of the conductors 20. Power supply terminal 13a is thus in electrical connection through resistor 12 to one of the conductor pair 20.

As basic circuit theory teaches, the voltage across a resistor such as resistor 12 is equal to the product of the resistor's value and the current passing through it. Therefore, measuring the voltage across resistor 12 allows precise measurement of the current flow through resistor 12 when the resistance of resistor 12 is known. The value of resistor 12 is selected to be quite small. For a typical power supply 13 and remote station 30, resistor 12 can have a value of a few ohms. A commercial embodiment using this invention has a resistor 12 having a value of 10 Ω. Voltage sensor 15 can comprise a voltage comparator such as an operational amplifier in combination with a voltage standard of some type which provides a preselected threshold voltage. Typical comparators have some hysteresis built into their design to prevent instability, so that the actual value of this threshold voltage is slightly different depending on whether the voltage across resistor 12 is increasing or decreasing.

Voltage sensor 15 has a pair of input terminals 15a and 15b connected to the two resistor 12 terminals. Voltage sensor 15 receives operating power from local power supply 16 through connections not shown. When the voltage across resistor 12 is greater than the preselected threshold value, voltage sensor 15 provides at current sensor terminals 15c and 15d, a current sensor signal having a first value. When the voltage across resistor 12 is less than this preselected threshold value, voltage sensor 15 provides at terminals 15c and 15d, a current sensor signal having a second value. Terminal 15d signals the change in current to an outside user. Terminal 15c is connected to data source 17 and carries the voltage sensor 15 signal as a control signal to data source 17, the dotted line implying that this is an optional connection. Connection of voltage sensor 15 output to data source 17 allows remote station 30 to control or modify the operation of data source 17 in some way.

Voltage sensor 15 will typically be an operational amplifier with some type of voltage standard such as a zener diode against which to measure the voltage across resistor 12. The value of resistor 12 is selected to be quite small compared to other impedances in series with it, so that resistor 12 does not affect the level of current flow appreciably. It is also possible to use current sensors which operate magnetically to detect the level of current flow. These dispense with resistor 12 but are functionally equivalent to the sensor 18 shown. In any case, a length of conductor through which current flows functions as the sensing element and corresponds to resistor 12, and has similar first and second portions fully equivalent to the terminals of resistor 12.

Remote station 30 has connection terminals 30a and 30b connected through the pair of conductors 20 to terminals 10a and 10b respectively of local station 10. For transmitting information to local station 10, remote station 30 has a current shunt 31 connected across connection terminals 30a and 30b and conductor pair 20. Current shunt 31 has a first non-zero impedance or resistance occurring responsive to a first value of a remote data signal provided at control terminal 31a. Shunt 31 has a second impedance or resistance higher than the first impedance responsive to a second value of the remote data signal at control terminal 31a. Changing the impedance of shunt 31 causes the current flow through resistor 12 to change as well, and it is this change in current that allows remote station 30 to communicate with local station 10.

The amount of current provided by power supply 13 to remote station 30 at a particular time depends on the internal impedance of station 30 at that time. This internal impedance has two major components which are in parallel connection with each other and across terminals 30a and 30b. The first component is that of voltage regulator 35 and the individual circuits (voltage sensor 46, second data source 40 and any other loads present) which draw power from voltage regulator 35. The combined impedance of these loads should be relatively constant since it is the remote station impedance changes which serve as the data transmission medium. The second component is shunt 31, whose value depends on the remote data signal value. The current which power supply 13 provides depends mainly on the station 30 impedance and to a lesser amount on the power supply 13 voltage.

For easiest detection by local station 10 of information sent from remote station 30, the current flow produced by the lower power supply 13 voltage level and the lower shunt 31 impedance must be lower than current flow produced by the higher power supply 13 voltage and the higher shunt 31 impedance. We prefer the threshold current level for current sensor 18 to be approximately midway between the current level when the power supply 13 voltage has its second (lower) level and shunt 31 has its first (lower) impedance, and when the power supply 13 voltage has its first (higher) level and shunt 31 has its second (higher) impedance. This threshold current level causes a voltage drop across resistor 12 which voltage sensor 15 can use to detect changes in the impedance of shunt 31. Other choices for power supply 13 voltages and shunt 31 impedances are possible and will also allow detection of shunt 31 impedance changes. These other choices unnecessarily complicate our application. For this reason we do not favor them at this time.

Current provided by power supply 13 also flows to the input terminals 35a and 35c of a voltage regulator 35. Voltage regulator 35 is designed to provide a constant voltage across its output terminals 35b and 35c. Terminal 35c thus serves as a common terminal for both the input and output voltages. In a preferred embodiment of this invention, voltage regulator 35 provides regulated 5 v. DC at about 6 ma. less a small amount of current, perhaps a maximum of 0.5 ma., flowing through terminal 35c to terminal 30b. 5.5 ma. is more than sufficient to operate a low power second data source 40 such as a microprocessor or a small discrete circuit, as well as voltage sensor 46.

Second data source 40 provides the remote data signal at its terminal 40a to terminal 31a of shunt 31. Source 40 may comprise an environmental sensor such as a thermistor in combination with an encoder which converts the data provided by the sensor or other data generator into a signal which can be used to modulate the impedance of shunt 31. Alternatively, data may be provided directly to source 40 by a signal on path 40b indicating the state of one or more switches, of which a keyboard is one example. Changes in the impedance of shunt 31 is the mechanism for transmitting to the local station 10, the value incorporating or encoding the remote data signal. In some cases it may be useful to modify or control the operation of data source 40 with a control signal carried on path 46a.

In a commercial embodiment, voltage regulator 35 and its loads such as voltage sensor 46 and data source 40 collectively draw approximately 6 ma., which corresponds to a nominal effective impedance of 2000 Ω for voltage regulator 35 and its loads. With power supply 13 voltages of 12 or 10 v., the first and second shunt 31 impedances can be respectively 2000 Ω and open circuit (infinite). With these values, shunt 31 causes the composite impedance when shunt 31 impedance is 2000 Ω (first value of the remote data signal and first impedance) to be 1000 Ω. When shunt 31 is open circuit (second impedance) the composite impedance is 2000 Ω. Thus, the higher composite impedance of remote station 30 is twice that of the lower composite impedance of remote station 30. Such a change in impedance will cause current flow through resistor 12 to approximately double when shunt 31 changes from its second to its first impedance. This will cause the voltage dropped across resistor 12 to approximately double when shunt 31 changes from the second to the first impedance regardless of the voltage which power supply 13 is supplying at that time. It is reasonable to use a shunt 31 having two impedance values which cause the composite impedance of remote station 30 to change by an approximate factor of two. Such a change will be easy to detect in local station 10 even with other varying or unpredictable circuit impedances which may not be easily controlled.

To state this concern in another way, one can see that for reliable operation, the nominal impedance for voltage regulator 35 and its loads must not vary during different phases of their operation so greatly that these impedance changes can simulate the impedance change for remote station 30 resulting from the changes in shunt 31 impedance. This involves issues of engineering judgment regarding component selection within remote station 30 and performance characteristics of other circuit and system components such as current sensor 18 and conductors 20. These issues are commonly addressed by those with mere ordinary skill in the electronic arts and are not of concern.

Communication from local station 10 to remote station 30 relies on the ability of remote station 30 to sense the power supply 13 voltage from the level of the voltage at terminals 30a and 30b. The voltage across terminals 30a and 30b is very close to the voltage across power supply terminals 13a and 13b since there is little voltage drop across either resistor 12 or conductors 20. Voltage sensor 46 has first and second voltage sensor input terminals 46c and 46d connected to connection terminals 30a and 30b. Voltage sensor 46 detects the voltage present across terminals 30a and 30b and provides a first value of a voltage sensor signal on output terminal 46a and 46b when the voltage potential differential between terminals 30a and 30b corresponds to the first preselected power voltage provided by power supply 13. When the voltage between terminals 30a and 30b corresponds to the second preselected power voltage, voltage sensor 46 provides a second value of the voltage sensor signal on output terminals 46a and 46b. The values carried on path 46b can be used by an external user. The values carried on path 46a form a control signal provided to data source 40 which can be used to modify or control the operation of data source 40. The dotted line format for path 46a indicates that this is an optional use of the level changes provided by voltage sensor 46.

In practice and in our preferred embodiment, voltage sensor 46 comprises a voltage comparator providing the first value of the voltage sensor signal when the voltage between the first and second voltage sensor terminals is greater than a preselected threshold value, and the second value otherwise. This threshold value should be approximately midway between the higher and lower power supply 13 voltages. Typical comparators have some hysteresis built into their design, so that the actual value of this threshold voltage is slightly different depending on whether the voltage is changing to the higher value from the lower or vice versa.

As discussed above, voltage regulator 35 and its loads should be selected to use a relatively constant amount of current regardless of their operating status. The change in current flow through conductors 20 which is caused by the impedance change of shunt 31 is much greater than the combined change in current flow resulting from changes in power supply voltage and changes in voltage regulator 35 and data source 40 current. It is easy to distinguish such a substantial change in current flow with current sensor 18 as long as the voltage provided by power supply 13 and the changes in load current are sufficiently small. Similarly, it is easy to detect the change in voltage at terminals 30a and 30b resulting from the change in power supply 13 voltage. While it seems to be counter-intuitive that information can flow in both directions simultaneously on the same pair of conductors 20 without using some type of carrier frequency, in fact this communication system makes this possible. At the same time, the local station 10 supplies operating power on these same pair of conductors to the remote station 30.

Figure 2:
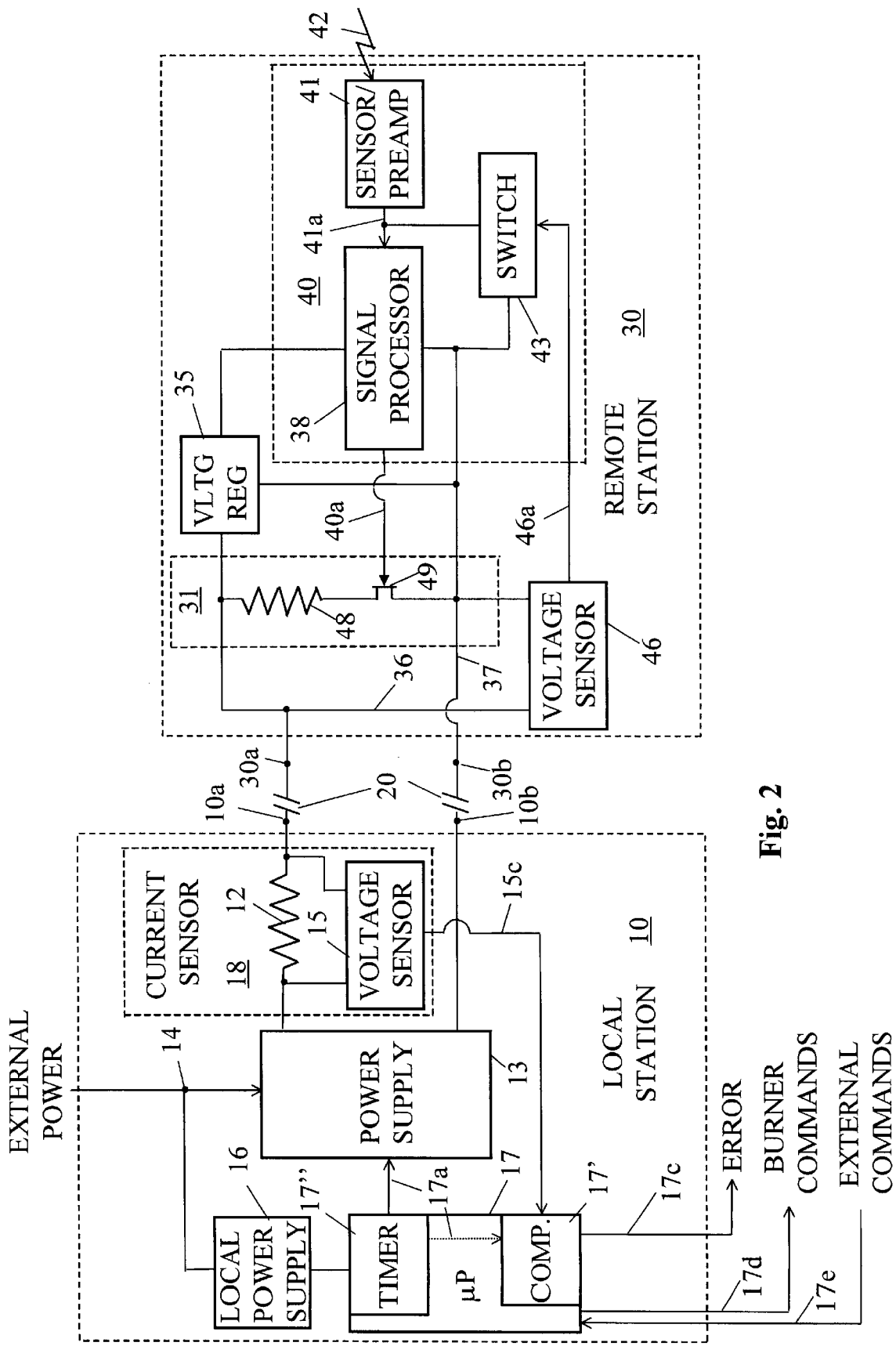
FIG. 2 is a more detailed block diagram of the invention suitable for use in a flame monitoring system.

We have developed an actual operating system whose block diagram is shown in FIG. 2, which uses the principles of the circuit of FIG. 1 to permit two way communication between a burner controller serving as local station 10 and a flame sensor unit assuming the role of remote station 30. Safe control of a burner requires periodic testing of the flame sensor unit to be sure that loss of flame can be reliably detected. The communication from local station 10 to remote station 30 defines intervals for testing the flame sensing unit. Communication from remote station 30 to local station 10 provides an indication of the flame sensing unit operation. If the indication suggests that the flame sensing unit may not be able to detect loss of flame, then local station 10 can shut down burner operation. In FIG. 2 where component functions are similar to components of FIG. 1, we use similar reference numbers in both FIGS. to suggest this similar functionality.

In FIG. 2, a microprocessor performs the function of local data source 17 and hence has the reference numeral 17. It is well known that microprocessors and microcontrollers can provide almost any type of electronic function such as a comparator, encoder, decoder, one shot or other type of timer, etc. Indeed, these devices can sequentially perform the functions of as many different of these devices as memory is available for the instructions which control the microcontroller or microprocessor to implement the desired functions. In FIG. 2, individual comparator and timer functions are shown as discrete components (17' and 17") of microprocessor 17. While there are a number of different types of microprocessors which are suitable for use as microprocessor 17, one which we use in a commercial embodiment is the Motorola MC68HC05C9.

During normal operation, microprocessor 17 provides a variety of commands to a burner, not shown, on path 17d, which path may comprise a number of paths dedicated to particular commands. These commands may initiate such actions as opening the burner's pilot fuel valve, activating the igniter, opening the main valve, modulating main valve position, etc. Similarly, microprocessor 17 receives commands from an external source on path 17e.

Two of the microprocessor 17 functions are separately shown; these employ the features of the invention. The timer 17" function of microprocessor 17 controls the power supply 13 voltage. There are a number of suitable control formats for power supply 13 voltage. That described in the following is strictly exemplary. In this exemplary format, microprocessor 17 while functioning as timer 17", normally provides the first value of the local data signal on path 17a, resulting in the first power supply 13 output voltage, 12 v. Periodically, say after a 6 sec. interval, timer 17" provides on path 17a to power supply 13 a test signal during which the local data signal has its second value, 10 v. This sequence of signals causes 12 v. across terminals 10a and 10b, and 30a and 30b for 6 sec. followed by an interval where the voltage across terminals 10a and 10b, and 30a and 30b is 10 v. The operation of comparator 17' will be described after operation of components within remote station 30 has been explained.

Within remote station 30, shunt 31 is shown as comprising a resistor 48 in series connection with a field effect transistor (FET) 49. Shunt 31 is connected between conductor 36 which serves as the power conductor and conductor 37 which provides the signal and power common conductor. Consistent with FIG. 1 and as an example, resistor 48 may be 2000 Ω and FET 49 impedance will be either 0 or infinite depending on the value of the remote data signal on path 40a. The signal on path 40a which causes FET 49 to conduct forms the first value of the remote data signal. The signal on path 40a which places FET 49 in open circuit status forms the second value of the remote data signal.

Second data source 40 in this embodiment functions as a flame detector. To cause current flow in conductors 20 when shunt 31 is conducting to be twice that when shunt 31 is not conducting, the impedance presented by the combination of voltage regulator 35 and remote data source 40 should be approximately equal to the resistance of resistor 48. This requirement is only general. All that is necessary is that sensor 15 in local station 10 be able to detect the impedance changes in shunt 31.

Second data source 40 is shown as including a sensor/preamp unit 41. As only one example, consider unit 41 to include a photovoltaic device such as a photodiode which provides in response to UV radiation (symbolized as stylized arrow 42), a small current on path 41a whose level indicates the intensity of the UV radiation. A preferred type of photodiode has an output current ranging from 1 to 20 picoamp. with 1 picoamp. indicating no UV radiation and 20 picoamp. indicating maximum UV intensity. While this is a very small current flow, a preamp is provided within unit 41 to increase the signal strength to a level allowing accurate detection of UV radiation provided by the combustion flame.

A signal processor 38 receives the sensor signal on path 41a. Because unit 41 provides only a low level signal on path 41a, processor 38 includes an amplifier which further increases the amplitude of the signal received on path 41a. Also, the low level of the sensor signal makes noise a further factor. To reduce the effect of noise, the amplified signal is further filtered by processor 38 to eliminate a portion of the noise. Suitable signal filtering algorithms are well known and need not be discussed. The magnitude of the amplified and filtered signal is encoded into the remote data signal on path 40a.

There are a multitude of encoding schemes for processor 38 to use. We prefer a pulse width modulation encoding scheme with 5 ms. long intervals. Processor 38 includes a timer providing clock pulses 5 ms. apart which define each start of the 5 ms. intervals. In this type of encoding, the higher current flow between stations 10 and 30 (when FET 49 is conducting and the remote data signal from processor 38 has its first value) defines the duration of each pulse within each 5 ms. interval. Processor 38 provides the second level of the remote data signal at the end of each pulse until the next 5 ms. clock pulse occurs. In our embodiment, processor 38 provides pulses whose widths are modulated to be from 5 to 95% of the 5 ms. interval. Absence of flame will thus cause a 250 μsec. long pulse width. Full flame will cause a 4.75 ms. long pulse width. The width of each pulse is proportional to the current output of sensor/preamp unit 41. This type of signal processing and encoding is well known in the art.

When the pulse waveform from remote station 30 is received by current sensor 18, the time of each transition to high or low current levels is detected and transmitted to microprocessor 17. If microprocessor 17 is currently commanding burner operation and is in a combustion mode, then microprocessor 17 measures the waveform duration and determines whether this duration indicates presence of flame. If no flame is detected, then microprocessor 17 signals on path 17d that the fuel valves must close and indicates an error on path 17c.

Real time testing of remote station 30 occurs when timer 17" provides as the test signal, the second value of the local data signal on path 17a to power supply 13. In response, voltage sensor 46 detects the change from 12 to 10 v. and provides a signal on path 46a to a switch 43 causing switch 43 to close for as long as test signal exists. Closing switch 43 connects path 41a to common conductor 37, setting the signal from sensor/preamp unit 41 to simulate essentially 0 picoamp. and thereby simulate absence of UV radiation which indicates a no flame condition. Because of the signal filtering, it may take as long as 400 ms. for the remote data signal on path 40a to reflect this change in the sensor signal on path 41a. If processor 38 is operating properly the remote data signal pulse width on path 40a will shrink to about 250 µs.

Microprocessor 17, functioning as comparator 17', measures this pulse width in the signal on path 15c and if the test signal is present on path 17a, interprets this pulse width as normal operation. Once normal operation has been detected in test mode, then timer 17" returns the local data signal value on path 17a to its normal first value and remote station returns to normal flame sensing. Of course, the signal processing within signal processor 38 will create a delay after the normal signal value reappears on path 41 a until the signal on path 40a begins to indicate presence of UV radiation. Should pulse width not shrink to 250 µs or so within 800 ms. of the start of the test signal, this indicates a potential failure in processor 38. Microprocessor 17 senses this condition and provides an error signal on path 17c, and may take other steps such as shutting down burner operation with a burner command on path 17d.

This communication system thus allows local station 10 to provide on the single pair of conductors 20, a test signal to remote station 30 while the remote station 30 is signaling the level of the sensor 41 signal to local station 10 on the same pair of conductors 20. At the same time, local station 10 is providing operating power to remote station 30.

The preceding has described our invention.

The following claims define what we wish to protect by Letters Patent:

1. A system for full duplex communication between a local station and a remote station with remote station power provided by the local station, and with communication and power transmission all occurring on first and second conductors, said system comprising in the local station, a) a modulating voltage power supply having a first power terminal for connection to the first conductor, a second power terminal, and a voltage control terminal for receiving a local data signal, and providing a first preselected power voltage between the first and second power terminals responsive to a first value of the local data signal, and a second preselected power voltage lower than the first power voltage between the first and second power terminals responsive to a second value of the local data signal;

b) a current sensor having a first current sensor terminal connected to the first power terminal, a second current sensor terminal in electrical connection to the first current sensor terminal and supplying current received at the first current sensor terminal, said second sensor terminal for connection to the first conductor, and said current sensor having a current signal terminal providing a current sensor signal having a first value responsive to current greater than a preselected value flowing from the first to the second current sensor terminal, and a second value otherwise;

and in the remote station, c) a voltage sensor having i) first and second voltage sensor terminals for connection through the first and second conductors respectively to the second current sensor terminal and to the second power terminal in the local station, and ii) a voltage signal terminal providing a voltage sensor signal having a first value when the voltage between the first and second voltage sensor terminals corresponds to the first preselected power voltage, and a second value when the voltage between the first and second voltage sensor terminals corresponds to the second preselected power voltage; and d) a current shunt connected between the first and second voltage sensor terminals and having a current control terminal for receiving a remote data signal, said shunt having a non-zero first impedance responsive to a first value of the remote data signal, and a second impedance greater than the first impedance responsive to a second value of the remote data signal, wherein the current sensor signal reproduces the data content of the remote data signal and the voltage sensor signal reproduces the data content of the local data signal.

2. The system of claim 1, including in the remote station a voltage regulator receiving power from the first and second conductors and providing a regulated voltage.

3. The system of claim 2, including a remote data source having a remote data source power terminal receiving the regulated voltage from the voltage regulator, and providing a remote data signal to the current control terminal.

4. The system of claim 3, wherein the remote data source is of the type whose operation is controllable by a control signal, and wherein the voltage signal terminal is connected to provide the control signal to the remote data source.

5. The system of claim 2, wherein the current shunt comprises a substantially fixed impedance and an electrically operated switch in series with the impedance and having a signal input terminal serving as the current control terminal and receiving the remote data signal, said switch closing and opening respectively responsive to the first and second values of the remote data signal.

6. The system of claim 5, including in the remote station a load receiving the regulated voltage, wherein the load, voltage regulator, and current shunt form between the first and second conductors a composite impedance having high and low impedance values as the switch is respectively open and closed, and wherein the high and low impedance values of the composite impedance provide through the conductors, current flow respectively above and below a datum current value.

7. The system of claim 6, wherein in the current sensor, the preselected value equals the datum current value.

8. The system of claim 2, including in the remote station a load receiving the regulated voltage, wherein the load, voltage regulator, and current shunt form between the first and second conductors a composite impedance having low and high impedance values as the remote data signal has its first and second values, and wherein the high and low impedance values of the composite impedance provide through the conductors, current flow respectively above and below a threshold current value.

9. The system of claim 8, wherein in the current sensor, the preselected value equals the threshold current value.

10. The system of claim 2, including in the local station a local data source providing to the power supply, a local data signal having a first preselected pattern, and in the remote station, a remote data source receiving power from the voltage regulator, and receiving the voltage sensor signal, and responsive to a voltage sensor signal pattern reproducing the first preselected pattern, providing the remote data signal having a second preselected pattern to the current shunt.

11. The system of claim 2, including in the local station a local data source providing to the power supply, a local data signal having a first preselected pattern, and in the remote station, a remote data source comprising:

i) a data generator providing the remote data signal with unpredictable durations of the first and second values to the current shunt; and ii) a switch operatively connected to the data generator and having a control terminal receiving the voltage sensor signal, said switch opening responsive to one of the first and second values of the voltage sensor signal and closing otherwise, said switch while in one of its open and closed states allowing the data generator to provide the remote data signal with unpredictable durations of the first and second values, and while in the other of the open and closed states causing the data generator to provide a remote data signal having a predetermined one of the first and second values.

12. The system of claim 11, wherein the data generator comprises i) a condition sensor providing a condition sensor signal having a level dependent on a condition sensed in the neighborhood of the condition sensor; and b) a signal modulator providing a preselected one of the first and second values of the remote data signal for a period of time dependent on the condition sensor signal level, and further including a connection between the switch and the condition sensor allowing the condition sensor signal to achieve a predetermined value responsive to a predetermined state of the switch.

13. The system of claim 11, wherein the local data source comprises i) a timer periodically providing a local data signal to the power supply causing the power supply to provide a predetermined power voltage level; and ii) a comparator receiving the local data signal from the timer and the current sensor signal, and comparing the value of the local data signal and the current sensor signal, and if not in conformance, issuing an error signal.

14. The system of claim 2, including at least one load receiving power from the voltage regulator, and wherein the at least one load and the voltage regulator provide a composite impedance which is approximately equal to the shunt's first impedance.

15. The system of claim 14, wherein the composite impedance changes, and wherein said changes in the composite impedance are small compared to the composite impedance.

16. The system of claim 1, wherein the voltage sensor comprises a voltage comparator providing the first value of the voltage sensor signal when the voltage between the first and second voltage sensor terminals is greater than a preselected value, and the second value otherwise.

17. The system of claim 1, including in the local station a local data source providing to the power supply, a local data signal having a first preselected pattern, said local station receiving a control signal modifying operation of the local station, and a connection providing the current sensor signal to the local station as the local station's control signal.

* * * * *